(12) United States Patent
Schorm et al.

(10) Patent No.: US 8,481,648 B2
(45) Date of Patent: Jul. 9, 2013

(54) PROCESS FOR PRODUCING CATIONICALLY STABILIZED AND WATER-REDISPERSIBLE POLYMER POWDER COMPOSITIONS

(75) Inventors: Andrea Schorm, Munich (DE);
Hans-Peter Weitzel, Reischach (DE);
Stefan Killat, Burghausen (DE);
Hermann Lutz, Emmerting (DE)

(73) Assignee: Wacker Chemie AG, Munich (DE)

( * ) Notice: Subject to any disclaimer, the term of this patent is extended or adjusted under 35 U.S.C. 154(b) by 918 days.

(21) Appl. No.: 12/279,444

(22) PCT Filed: Feb. 8, 2007

(86) PCT No.: PCT/EP2007/051209
§ 371 (c)(1),
(2), (4) Date: Aug. 14, 2008

(87) PCT Pub. No.: WO2007/093551
PCT Pub. Date: Aug. 23, 2007

(65) Prior Publication Data
US 2009/0030168 A1    Jan. 29, 2009

(30) Foreign Application Priority Data
Feb. 16, 2006    (DE) .................. 10 2006 007 282

(51) Int. Cl.
*C08F 2/16* (2006.01)

(52) U.S. Cl.
USPC ............. 525/217; 525/55; 525/191; 524/459; 526/202

(58) Field of Classification Search
USPC .................... 526/202; 524/459; 525/55, 191, 525/217
See application file for complete search history.

(56) References Cited

U.S. PATENT DOCUMENTS

| | | | |
|---|---|---|---|
| 5,350,787 A * | 9/1994 | Aydin et al. | 524/162 |
| 5,567,750 A | 10/1996 | Schulze et al. | |
| 5,874,524 A * | 2/1999 | Pakusch et al. | 528/482 |
| 6,559,236 B1 | 5/2003 | Willimann et al. | |
| 6,762,221 B1 | 7/2004 | Pakusch et al. | |
| 6,765,072 B1 | 7/2004 | Willimann et al. | |
| 7,071,260 B1 | 7/2006 | Kuropka et al. | |
| 2002/0062006 A1 | 5/2002 | Sandor et al. | |
| 2007/0167539 A1 | 7/2007 | Pietsch et al. | |
| 2008/0090980 A1 | 4/2008 | Willimann et al. | |
| 2009/0030168 A1 | 1/2009 | Schorm et al. | |

FOREIGN PATENT DOCUMENTS

| | | |
|---|---|---|
| DE | 2 049 114 | 3/1974 |
| DE | 24 45 813 | 4/1976 |
| EP | 0 073 807 B1 | 7/1985 |
| EP | 0 407 889 A1 | 1/1991 |
| EP | 0632096 A1 | 1/1995 |
| EP | 0770640 A2 | 5/1997 |
| EP | 0 982 351 A1 | 2/2000 |
| EP | 0 770 640 B1 | 4/2003 |
| EP | 0 149 098 | 8/2008 |
| JP | 57121671 A | 7/1982 |
| JP | 58185640 A | 10/1983 |
| JP | 58185640 A2 | 10/1983 |
| JP | 59030827 A | 2/1984 |
| JP | 07041632 A2 | 2/1995 |
| JP | 09169812 A2 | 6/1997 |
| JP | 2000515187 | 11/2000 |
| JP | 2002138145 A2 | 5/2002 |
| JP | 2002521506 | 7/2002 |
| JP | 2002521507 | 7/2002 |
| JP | 2002521511 | 7/2002 |
| JP | 2003514976 | 4/2003 |
| JP | 2007524747 | 8/2007 |
| WO | 98/13411 | 4/1998 |
| WO | 00/05275 | 2/2000 |
| WO | 00/05283 | 2/2000 |
| WO | 0005275 A1 | 2/2000 |
| WO | 2005/080478 A1 | 9/2005 |
| WO | 2007093551 A1 | 8/2007 |

OTHER PUBLICATIONS

English Abstract corresponding to EP 0 982 351.
Flick, E.W., Water Soluble Resins—A Industrial Guide, 2d Ed., Contents and Subject Index pp. viii, x, xii, and xiv, "Callaway Chemical Co.," pp. 75, 77, 79, 81, and 83, Noyes Publications.
English Abstract corresponding to DE 2 049 114.
English Abstract corresponding to 24 45 813.
English Abstract corresponding to EP 0 407 889.
English Abstract corresponding to EP 0 149 098.

* cited by examiner

*Primary Examiner* — Vu A Nguyen
(74) *Attorney, Agent, or Firm* — Brooks Kushman P.C.

(57) ABSTRACT

Redispersible polymer powders which are cationically stabilized by spray drying a polymer dispersion with a cationic polymer can be used in higher concentrations in chemical building construction materials without introducing adverse properties.

8 Claims, No Drawings

PROCESS FOR PRODUCING CATIONICALLY STABILIZED AND WATER-REDISPERSIBLE POLYMER POWDER COMPOSITIONS

CROSS-REFERENCE TO RELATED APPLICATION

This application is the U.S. national phase of PCT Appln. No. PCT/EP2007/051209 filed Feb. 8, 2007 which claims priority to German application DE 2006 007 282.0 filed Feb. 16, 2006.

BACKGROUND OF THE INVENTION

1. Field of the Invention

The invention relates to a process for preparation of cationically stabilized and water-redispersible polymer powder compositions, where one or more ethylenically unsaturated monomers are subjected to free-radical polymerization in an aqueous medium in the presence of a non-ionic protective colloid and/or of a non-ionic emulsifier and then dried.

2. Description of the Related Art

Aqueous polymer dispersions can be stabilized via dispersing agents which have properties making them active at interfaces. Water-soluble compounds in the form of protective colloids or emulsifiers exert this function. The stabilization can be achieved via steric interactions, for example via non-ionic polymers and emulsifiers, or via electrostatic interactions, the latter taking place via anionic or cationic functional groups in polymers or emulsifiers, or via an appropriate combination thereof.

When redispersible dispersion powders are prepared whose monomer base comprises vinyl esters, vinyl chloride, (meth)acrylate monomers, styrene, butadiene and/or ethylene, these being used in a wide variety of applications, for example as coating compositions or adhesive compositions for a very wide variety of substrates, polyvinyl alcohol is preferred as protective colloid during polymerization and drying, since polyvinyl alcohol gives the powder effective stability with respect to premature coalescence of the particles. However, if relatively large amounts of dispersion powder are used in the final application, the polyvinyl alcohol content can have an adverse effect. By way of example, there is an adverse effect on the workability of polymer-modified hydraulically setting mortar compositions based on cements or gypsum, the reason being high trowel adhesion and high viscosity. High polyvinyl alcohol content also brings about low flexibility of the adhesive bonds produced by the mortar composition.

Possible alternatives used instead of polyvinyl alcohol as drying aid are formaldehyde condensates of melaminesulphonic acid (DE-A 2049114), of naphthalenesulphonic acid (DE-A 2445813), and of phenolsulphonic acid (EP-A 407889), or aliphatic aldehyde condensates of dihydroxybiphenylsulphonic acid (WO A 2005080478). Lignosulphonates (EP-A 149098) or polyelectrolytes functionalized by anionic groups (EP-A 073807, EP-A 982351) are also used. A disadvantage of these alternatives is the large amount used of drying aid, this amount being needed in order to obtain a blocking-resistant and rapidly redispersible powder. Furthermore, the brown coloration that occurs in the mortar composition with sulphonic acid formaldehyde condensates or lignosulphonates is undesirable in certain applications.

Cationically stabilized dispersion powders have been previously described in the prior art: WO-A 00/05275 discloses a process in which cationic monomers are polymerized in an aqueous medium and other monomers are polymerized in the presence of the resultant polymer which has been formed in situ. The polymer dispersion thus obtained is then spray-dried in the presence of polyvinyl alcohol. WO-A 00/05283 describes a process analogous thereto, and here the control of the process is such as to form copolymer particles with heterogeneous morphology. However, a disadvantage of the process is that large amounts of polyvinyl alcohol as protective spray-drying colloid are needed for preparation of the dispersion powder by means of spray drying of the polymer dispersion initially obtained, the result therefore being occurrence of the abovementioned shortcomings when large amounts of powder are used.

EP-A 0770640 describes a process for preparation of redispersible polymer powders which dries an aqueous polymer dispersion whose dispersed polymer particles have a negative or positive electrical surface charge, where the drying aid selected comprises a polyion whose surface charge opposes that of the dispersed polymer particles. A disadvantage of this process is that partial coagulation of the polymer particles can occur during mixing of dispersion and protective colloid prior to the spray-drying process, and the powder obtained can therefore have relatively poor redispersibility.

WO-A 98/13411 describes the preparation of redispersible dispersion powders which are obtained via spray drying of an emulsion polymer which contains anionic groups, preferably COOH groups, with amphoteric polymers, preferably casein or sodium caseinate. The amount of the protective colloid used in the spray-drying process is stated as from 2 to 10% by weight, but completely tack-free, flowable powders are not obtained until 10% by weight is reached. A disadvantage of casein as protective colloid is its natural origin and the variable product quality associated therewith, which can make the quality of the powder inconsistent. Furthermore, casein, like all proteins, eliminates ammonia under alkaline conditions, causing VOC pollution (VOC=volatile organic compounds).

SUMMARY OF THE INVENTION

Against this background, an object was to develop a dispersion powder which utilizes the advantages of polyvinyl alcohol, itself acting as binder, but which reduces the level of workability disadvantages when relatively large amounts of dispersion powder are used and which generates improved flexibility in hydraulically setting compositions. These and other objects are provided by a process for preparation of cationically stabilized and water-redispersible polymer powder compositions, where one or more ethylenically unsaturated monomers are subjected to free-radical polymerization in an aqueous medium in the presence of a non-ionic protective colloid and/or of a non-ionic emulsifier and then dried, characterized in that the resultant aqueous polymer dispersions are dried in the presence of a cationic protective colloid as a drying aid.

DETAILED DESCRIPTION OF THE PREFERRED EMBODIMENTS

Suitable cationic protective colloids are polymers having cationic charge. Examples of these polymers are described in E. W. Flick, Water-Soluble Resins—an Industrial Guide, Noyes Publications, Park Ridge, N.J., 1991. Preference is given to polymers which contain cationic monomer units, particular preference being given to monomer units having quaternary ammonium groups, sulphonium groups and phosphonium groups. Most preference is given to homo- or copolymers of one or more cationic monomers from the group consisting of diallyldimethylammonium chloride (DADMAC), diallyldiethylammonium chloride (DADEAC), (3-methacryloxy)propyltrimethylammonium chloride (MPTAC), (3-methacryloxy)ethyltrimethylammonium chloride (METAC), (3-methacrylamido)propyltrimethylammonium chloride (MAPTAC), 2-dimethylaminoethyl methacrylate or 3-dimethylaminopropylmethacrylamide (DMAEMA or DMAPMA at pH≦5, protonated species).

The cationic protective colloids generally contain from 20 to 100% by weight, preferably from 50 to 100% by weight, and more preferably 100% by weight, of cationic monomer units, based on the total weight of the cationic protective colloid. Suitable non-ionic copolymerizable monomers are vinyl esters having from 1 to 15 carbon atoms in the carboxylic acid radical, e.g. vinyl acetate, vinyl propionate, and vinyl dodecanoate; acrylamide; hydroxyethyl(meth)acrylate; hydroxypropyl(meth)acrylatea; esters of methacrylic acid and acrylic acid with alcohols having from 4 to 13 carbon atoms; polyalkylene glycol (meth)acrylates having from $C_2$- to $C_4$ alkylene units and molecular weights of from 350 to 2000 g/mol; and also N-vinylpyrrolidone; N-vinylcaprolactam; acryloxypropyltrialkoxy- and methacryloxypropyltrialkoxysilanes; vinyltrialkoxysilanes and vinylmethyldialkoxysilanes; and/or mixtures of the non-ionic comonomers mentioned.

The cationic protective colloids can be prepared by means of polymerization processes known to the person skilled in the art, e.g. via free-radical polymerization in aqueous solution, in solvent mixtures or in the presence of salts, e.g. also in a precipitation-polymerization process, e.g. via polymer-analogous reaction in solution or solvent mixtures, e.g. in suspension or, for example, via inverse emulsion polymerization. The initiators here can be water-soluble or oil-soluble and may be, for example, persulphates, peroxides, azo compounds, or else of the oxidation/reduction initiator pairs. Especially with the last-mentioned method of inverse emulsion polymerization or water-in-oil polymerization, extremely high-molecular-weight cationic polymers are obtained whose molecular masses are >5,000,000 g/mol. When the cationic protective colloids are prepared by means of polymer-analogous reaction, the corresponding non-ionic protective colloids are reacted with cationic compounds to give cationic monomer units. An example of this is the acetalization of polyvinyl alcohol with cationic aldehydes.

Greatest preference is given to preparation via solution polymerization in water with small solids content (preferably ≦40% by weight) in the presence of water-soluble initiators, e.g. azo initiators or redox initiators, if appropriate in the presence of molecular weight regulators, e.g. mercaptopropionic acid or 2 mercaptoethanol.

Preference is given to cationic protective colloids whose K value (determined by a method based on DIN 53726, 1% by weight in water, 25° C., Ubbelohde viscosimeter) is from 10 to 250, more preferably from 25 to 130. The change with respect to DIN 53726, which is the standard for determining viscosity of PVC in an Ubbelohde viscosimeter, is that water is used as solvent instead of cyclohexanone. The Höppler viscosity of the cationic protective colloids is from 1 to 50 mPas, preferably from 1 to 25 mPas, most preferably from 1 to 15 mPas (determined in each case by the Höppler method at 20° C. to DIN 53015).

Monomers suitable for preparation of the aqueous polymer dispersion of the film-forming base polymer are vinyl esters of unbranched or branched alkylcarboxylic acids having from 1 to 15 carbon atoms, methacrylates and acrylates of alcohols having from 1 to 15 carbon atoms, vinylaromatics, olefins, dienes or vinyl halides.

Preferred vinyl esters are vinyl acetate, vinyl propionate, vinyl butyrate, vinyl 2-ethylhexanoate, vinyl laurate, 1 methylvinyl acetate, vinyl pivalate and vinyl esters of alpha-branched monocarboxylic acids having from 9 to 13 carbon atoms, e.g. VeoVa9® or VeoVa10® vinyl esters (trade mark of Resolution). Particular preference is given to vinyl acetate. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate. Examples of olefins and dienes are ethylene, propylene and 1,3-butadiene. Suitable vinylaromatics are styrene and vinyltoluene. A suitable vinyl halide is vinyl chloride.

If appropriate, it is also possible to copolymerize from 0.05 to 50% by weight, preferably from 1 to 10% by weight, based on the total weight of the main polymer, of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and ethylenically unsaturated carbonitriles, preferably acrylamide and acrylonitrile; mono- and diesters of fumaric acid and maleic acid, e.g. the diethyl and diisopropyl esters, and also maleic anhydride, ethylenically unsaturated sulphonic acids or their salts, preferably vinylsulphonic acid, 2-acrylamido-2-methylpropanesulphonic acid. Other examples are pre-crosslinking comonomers, e.g. ethylenically polyunsaturated comonomers, e.g. divinyl adipate, diallyl maleate, allyl methacrylate or triallyl cyanurate, or post-crosslinking comonomers, e.g. acrylamido-glycolic acid (AGA), methyl methylacrylamidoglycolate (MAGME), N-methylolacrylamide (NMA), N-methylolmethacrylamide (NMMA), allyl N-methylolcarbamate, alkyl ethers, e.g. isobutoxy ether or esters of N-methylolacrylamide, of N-methylolmethacrylamide and of allyl N-methylolcarbamate. Epoxy-functional comonomers are also suitable, e.g. glycidyl methacrylate and glycidyl acrylate. Other examples are silicon-functional comonomers, e.g. acryloxypropyltri(alkoxy)- and methacryloxypropyltri(alkoxy)silanes, vinyltrialkoxysilanes and vinylmethyldialkoxysilanes, where examples of alkoxy groups that can be present are methoxy, ethoxy and ethoxypropylene glycol ether radicals. Mention may also be made of monomers having hydroxy or CO groups, e.g. hydroxyalkyl esters of methacrylic acid and of acrylic acid, e.g. hydroxyethyl, hydroxypropyl or hydroxybutyl acrylate or hydroxyethyl, hydroxypropyl or hydroxybutyl methacrylate, and also of compounds such as diacetoneacrylamide and acetylacetoxyethyl acrylate or acetylacetoxyethyl methacrylate. Other suitable comonomers are vinyl alkyl ethers, e.g. vinyl methyl ether, vinyl ethyl ether, vinyl isobutyl ether, vinyl octadecyl ether.

Examples of homo- and copolymers suitable as main polymer are vinyl acetate homopolymers, copolymers of vinyl acetate with ethylene, copolymers of vinyl acetate with ethylene and with one or more other vinyl esters, copolymers of vinyl acetate with ethylene and acrylate, copolymers of vinyl acetate with ethylene and vinyl chloride, styrene-acrylate copolymers, styrene-1,3-butadiene copolymers.

Preference is given to vinyl acetate homopolymers; copolymers of vinyl acetate with from 1 to 40% by weight of ethylene;
copolymers of vinyl acetate with from 1 to 40% by weight of ethylene and from 1 to 50% by weight of one or more other comonomers from the group of vinyl esters having from 1 to 15 carbon atoms in the carboxylic acid radical, e.g. vinyl propionate, vinyl dodecanoate, vinyl esters of alpha-branched carboxylic acids having from 9 to 13 carbon atoms, e.g. VeoVa9®, VeoVa10®, VeoVa11®; copolymers of vinyl acetate, from 1 to 40% by weight of ethylene and preferably from 1 to 60% by weight of acrylate of unbranched or branched alcohols having from 1 to 15 carbon atoms, in particular n-butyl acrylate or 2-ethylhexyl acrylate; and copolymers having from 30 to 75% by weight of vinyl acetate, from 1 to 30% by weight of vinyl laurate or vinyl ester of an alpha-branched carboxylic acid having from 9 to 13 carbon atoms, and also from 1 to 30% by weight of acrylate of unbranched or branched alcohols having from 1 to 15 carbon atoms, in particular n-butyl acrylate or 2-ethylhexyl acrylate, which also contain from 1 to 40% by weight of ethylene; copolymers with vinyl acetate, from 1 to 40% by weight of ethylene and from 1 to 60% by weight of vinyl chloride; where the polymers can also contain the amounts mentioned of the auxiliary monomers mentioned and the data in % by weight always give a total of 100% by weight.

Preference is also given to (meth)acrylate polymers, e.g. copolymers of n-butyl acrylate or 2-ethylhexyl acrylate or copolymers of methyl methacrylate with n-butyl acrylate and/or 2-ethylhexyl acrylate and, if appropriate, ethylene; styrene-(meth)acrylate copolymers having one or more monomers from the group of methyl acrylate, ethyl acrylate, propyl acrylate, n-butyl acrylate, 2-ethylhexyl acrylate; vinyl acetate-(meth)acrylate copolymers having one or more monomers from the group of methyl acrylate, ethyl acrylate, propyl acrylate, n-butyl acrylate, 2-ethylhexyl acrylate and, if appropriate, ethylene; styrene-1,3-butadiene copolymers; where the polymers can still contain the amounts mentioned of the auxiliary monomers mentioned, and the data in % by weight always give a total of 100% by weight.

The selection of the monomers or the selection of the proportions by weight of the comonomers here is such as generally to give a glass transition temperature Tg of from −50° C. to +50° C., preferably from −30° C. to +10° C. The glass transition temperature Tg of the polymers can be determined in a known manner by means of differential scanning calorimetry (DSC). Tg can also be approximated by means of the Fox equation. According to Fox T. G., Bull. Am. Physics Soc. 1, 3, page 123 (1956): $1/Tg=x1/Tg1+x2/Tg2+\ldots+xn/Tgn$, where xn is the mass fraction (% by weight/100) of the monomer n and Tgn is the glass transition temperature in kelvin of the homopolymer of the monomer n. Tg values for homopolymers are listed in Polymer Handbook 2nd Edition, J. Wiley & Sons, New York (1975).

The homo- and copolymers are preferably prepared by the emulsion polymerization process, the polymerization temperature generally, but not necessarily, being <100° C.

Irrespective of the polymerization process, the polymerization can be carried out with or without use of seed lattices, using initial charge of all of the, or of individual, constituents of the reaction mixture, or using some extent of initial charge and subsequent feed of the, or of individual, constituents of the reaction mixture, or by the feed process without initial charge. It is possible to use all of the comonomers as initial charge for preparation of the dispersion (batch process), or to use a portion of the monomers as initial charge and to use the remainder as a feeder (semibatch process).

The polymerization is initiated by initiators familiar for emulsion polymerization, these being water-soluble initiators, or redox initiator combinations. Examples of water-soluble initiators are the sodium, potassium and ammonium salts of peroxodisulphuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, azobisisobutyronitrile. The amount of the initiators generally used is from 0.001 to 0.02% by weight, preferably from 0.001 to 0.01% by weight, based in each case on the total weight of the monomers. Redox initiators used comprise combinations of the initiators mentioned in combination with reducing agents. Suitable reducing agents are the sulphites and bisulphites of the alkali metals and of ammonium, e.g. sodium sulphite, the derivatives of sulphoxylic acid, e.g. zinc formaldehyde-sulphoxylates or alkali metal formaldehyde-sulphoxylates, e.g. sodium hydroxymethanesulphinate, and ascorbic acid. The amount of reducing agent is generally from 0.001 to 0.03% by weight, preferably from 0.001 to 0.015% by weight, based in each case on the total weight of the monomers.

For molecular weight control, regulating substances can be used during the polymerization. If regulators are used, their amounts used are usually from 0.01 to 5.0% by weight, based on the monomers to be polymerized, and they are generally fed separately or else premixed with reaction components. Examples of these substances are n-dodecyl mercaptan, tert-dodecyl mercaptan, mercaptopropionic acid, methyl mercaptopropionate, isopropanol and acetaldehyde.

The polymerization preferably takes place in the presence of non-ionic protective colloid. Suitable non-ionic protective colloids are polyvinyl alcohols, polyvinyl acetals, polyvinylpyrrolidones, polysaccharides in water-soluble form, e.g. starches (amylose and amylopectin), celluloses and their methyl, hydroxyethyl, hydroxypropyl derivatives, poly (meth)acrylamide.

Preference is given to partially hydrolysed or fully hydrolysed polyvinyl alcohols whose degree of hydrolysis is from 80 to 100 mol %, in particular partially hydrolysed polyvinyl alcohols whose degree of hydrolysis is from 80 to 95 mol % and whose Höppler viscosity is from 1 to 30 mPas in 4% strength aqueous solution (Höppler method at 20° C., DIN 53015). Preference is also given to partially hydrolysed, hydrophobically modified polyvinyl alcohols whose degree of hydrolysis is from 80 to 95 mol % and whose Höppler viscosity is from 1 to 30 mPas in 4% strength aqueous solution. Examples of these are partially hydrolysed copolymers of vinyl acetate with hydrophobic comonomers, e.g. isopropenyl acetate, vinyl pivalate, vinyl ethylhexanoate, vinyl esters of saturated alpha-branched monocarboxylic acids having 5 or from 9 to 13 carbon atoms, dialkyl maleates and dialkyl fumarates, e.g. diisopropyl maleate and diisopropyl fumarate, vinyl chloride, vinyl alkyl ethers, e.g. vinyl butyl ether, olefins, e.g. ethene and decene. The proportion of the hydrophobic units is preferably from 0.1 to 10% by weight, based on the total weight of the partially hydrolysed polyvinyl alcohol. It is also possible to use mixtures of the polyvinyl alcohols mentioned.

Greatest preference is given to polyvinyl alcohols whose degree of hydrolysis is from 85 to 94 mol % and whose Höppler viscosity is from 3 to 15 mPas in 4% strength aqueous solution (Höppler method at 20° C., DIN 53015). The protective colloids mentioned are accessible by means of processes known to the person skilled in the art, the total amount of these generally added during the polymerization being from 1 to 20% by weight, based on the total weight of the monomers.

The polymerization can also be carried out in the presence of non-ionic emulsifiers or in the presence of the non-ionic protective colloids mentioned in combination with non-ionic emulsifiers. Suitable non-ionic emulsifiers are surfactants, e.g. alkyl polyglycol ether or alkylaryl polyglycol ether having from 8 to 40 alkylene oxide units. Preference is given to alkoxylated $C_8$-$C_{16}$ alkanols alkoxylated by $C_2$-$C_4$ alkylene oxides, in particular ethylene oxide and propylene oxide, or mixtures of these. The amount of the non-ionic emulsifiers generally added during the polymerization is from 0.05 to 10% by weight, based on the total weight of the monomers.

After conclusion of the polymerization, post-polymerization can be carried out using known methods in order to remove residual monomers, the general method used being redox-catalyst-initiated post-polymerization. Volatile residual monomers can also be removed by means of distillation, preferably under reduced pressure, and, if appropriate, while passing air or steam or inert entrainer gases, such as nitrogen, over or through the material. The aqueous dispersions thus obtainable have from 30 to 75% by weight solids content, preferably from 50 to 60% by weight.

To prepare the water-redispersible polymer powders, the aqueous dispersions are dried, after addition of the cationic protective colloids as drying aid. The cationic protective colloid here can also be used in combination with non-ionic protective colloid or in combination with non-ionic emulsifier. Non-ionic protective colloids and non-ionic emulsifiers suitable for this purpose are the non-ionic protective colloids and non-ionic emulsifiers mentioned as suitable above for the polymerization.

By way of example, the drying method may be fluidized-bed drying, freeze drying or spray drying. The dispersions are preferably spray-dried. This spray drying takes place in conventional spray-drying systems, and atomization here can take place by means of single-, twin- or multifluid nozzles or can use a rotating plate. The discharge temperature is generally selected in the range from 45° C. to 120° C., preferably from 60° C. to 90° C., as a function of the system and of the desired extent of drying.

The total amount of the cationic protective colloid generally used, if appropriate in combination with non-ionic protective colloid and/or with non-ionic emulsifier, is from 0.1 to 20% by weight, preferably from 1 to 7% by weight, based in each case on the polymeric constituents of the dispersion.

Content of up to 2% by weight of antifoam, based on the main polymer, has often proven advantageous during the drying process. The powder obtained can be equipped with an antiblocking agent (anticaking agent), preferably up to 30% by weight, based on the total weight of polymeric constituents, in order to improve storage capability via improvement in blocking resistance, in particular in the case of powders with low glass transition temperature. Examples of antiblocking agents are Ca carbonate, Mg carbonate, talc, gypsum, silica, kaolins, metakaolins, and silicates with particle sizes preferably in the range from 10 nm to 100 µm.

The viscosity of the mixture to be atomized and to be dried is set by way of the solids content so that the value obtained is <1000 mPas (Brookfield viscosity at 20 rpm and 23° C.), preferably <500 mPas, most preferably <250 mPas. The solids content of the mixture to be atomized should be >30% by weight, more preferably >40% by weight.

To improve performance characteristics, other additives can be added prior to or during or after the drying process. Examples of other constituents present in preferred embodiments of dispersion powder compositions are pigments, fillers, foam stabilizers, hydrophobicizing agents, and plasticizers.

The cationically stabilized and water-redispersible polymer powder compositions can be used in the application sectors typical for these. It is also possible to use blends of the cationically stabilized dispersion powders with conventional dispersion powders.

Examples of applications are those in construction-chemistry products, if appropriate in combination with hydraulically setting binders, e.g. cements (Portland cement, alumina cement, pozzolanic cement, slag cement, magnesia cement, phosphate cement), gypsum plaster and water glass, for production of construction adhesives, in particular tile adhesives (e.g. high-flexibility adhesive) and exterior-insulation-system adhesives, renders, trowelling compounds, floor-filling compositions, levelling compositions, sealing slurries, jointing mortars and paints. Preferred application sectors are sealing slurries and tile adhesives, and in particular tile adhesives for wood substrates. Other possible applications are found via use in the adhesive and coating sector, an example of the latter application being for paper and textile.

Surprisingly, the inventive procedure gives dispersion powders which, although the proportion of cationic polymers as drying aids is low, preferably from 1 to 7% by weight, give blocking-resistant powders whose redispersibility is very good.

Surprisingly, it has also been found that the cationic polymer not only has an advantageous effect on workability in polymer-modified compositions, e.g. sealing slurries, tile adhesives, renders, but also improves flexibility of these compositions, e.g. with respect to tensile strain at break of a polymer-modified sealing slurry.

EXAMPLES

Dispersion 1 (D1)

The starting dispersion used comprised a vinyl acetate-ethylene copolymer dispersion with solids content of 50% by weight and Tg of −7° C., prepared using 6% by weight of polyvinyl alcohol whose degree of hydrolysis is 88 mol % and whose Höppler viscosity is 4 mPas.

Dispersion 2 (D2)

The starting dispersion used comprised a vinyl acetate-ethylene-VeoVa10 copolymer dispersion with solids content of 52% by weight and Tg of −15° C., prepared using 5% by weight of polyvinyl alcohol whose degree of hydrolysis is 88 mol % and whose Höppler viscosity is 4 mPas.

Dispersion 3 (D3)

The starting dispersion used comprised a vinyl acetate-ethylene-vinyl dodecanoate copolymer dispersion with solids content of 50% by weight and Tg of −24° C., prepared using 6% by weight of polyvinyl alcohol whose degree of hydrolysis is 88 mol % and whose Höppler viscosity is 4 mPas.

Dispersion 4 (D4)

The starting dispersion used comprised an ethylhexyl acrylate-methyl methacrylate copolymer dispersion with solids content of 51% by weight and Tg of −13° C., prepared using 2.5% by weight of polyvinyl alcohol whose degree of hydrolysis is 88 mol % and whose Höppler viscosity is 4 mPas and, respectively, 13 mPas.

Dispersion 5 (D5)

The starting dispersion used comprised a vinyl acetate-ethylene copolymer dispersion with solids content of 55% by weight and Tg of 16° C., prepared using 8% by weight of polyvinyl alcohol whose degree of hydrolysis is 88 mol % and whose Höppler viscosity is 4 mPas.

Dispersion 6 (D6)

The starting dispersion used comprised a vinyl acetate-ethylene-VeoVa10 copolymer dispersion with solids content of 55% by weight and Tg of 5° C., prepared using 10% by weight of polyvinyl alcohol whose degree of hydrolysis is 88 mol % and whose Höppler viscosity is 4 mPas.

Dispersion 7 (D7)

The starting dispersion used comprised a styrene-butyl acrylate copolymer dispersion with solids content of 55% by weight and Tg of 20° C., prepared using 10% by weight of polyvinyl alcohol whose degree of hydrolysis is 88 mol % and whose Höppler viscosity is 4 mPas.

Protective Colloid 1 (PC 1): (polyMETAC)

A mixture composed of 795 g of water and 201 g of 2-methacryloxyethyltrimethylammonium chloride was used as initial charge in a polymerization vessel and heated to 73° C. Within a period of 180 min. 20.12 g of a 10% strength initiator solution (VA-044: 2,2'-azobis[2-(2-imidazolin-2-yl)propane]dihydrochloride) were metered continuously into the mixture. The reaction solution was stirred for a further 30 min. at 73° C. and then cooled. This gave a clear yellowish 19.8% by weight solution whose pH was 3.1. The K value of the 1% strength polymer solution in water was 75.9. The Höppler viscosity of a 4% strength aqueous solution was 7.8 mPas.

Protective Colloid 2 (PC 2): (polyMAPTAC)

A mixture composed of 988 g of water and 6.8 g of a 50% strength aqueous acetic acid solution was heated to 80° C. Once temperature equilibrium had been reached, 96 g of a 7% strength initiator solution (VA-044: 2,2'-azobis[2-(2-imidazolin-2-yl)propane]dihydrochloride), and also 910 g of a 50% strength aqueous 2-methacrylamidopropyltrimethylammonium chloride solution were simultaneously and continuously metered into the mixture over a period of 180 min. The reaction solution was stirred for a further 60 min. at 80° C. and then cooled. This gave a clear yellowish 25.4% by weight solution whose pH was 3.4. The K value of the 1% strength polymer solution in water was 29. The Höppler viscosity of a 4% strength aqueous solution was 1.9 mPas.

Protective Colloid 3 (PC 3): (polyDMAEMA/METAC)

A mixture composed of 778 g of water, 179 g of 2-dimethylamino-ethyl methacrylate and 18 g of 2-methacryloxyethyltrimethyl-ammonium chloride was used as initial charge in a polymerization vessel and heated to 73° C. Within a period of 180 min. 22.1 g of a 10% strength initiator solution (VA-044: 2,2'-azobis[2-(2-imidazolin-2-yl)propane]dihydrochloride) were metered continuously into the mixture. The reaction solution was stirred for a further 30 min. at 73° C. and then cooled. This gave a clear yellowish 18.2% by weight solution whose pH was 9.2. The K value of the 1% strength polymer solution in water was 48.1. The Höppler viscosity of a 4% strength aqueous solution was 5.8 mPas.

Commercially available protective colloids based on polyDADMAC, e.g. Catiofast® CS from BASF or Superfloc® C-592 from Cytec are likewise suitable protective colloids for preparation of cationic dispersion powders.

Protective Colloid 4 (PC4):

Catiofast® CS: 30% strength aqueous solution; K value of 1% strength polymer solution in water is 72. Höppler viscosity of a 4% strength aqueous solution is 7.5 mPas.

Protective Colloid 5 (PC5):

Superfloc® C-592: 39% strength aqueous solution; K value of 1% strength polymer solution in water is 92. Höppler viscosity of a 4% strength aqueous solution is 12.2 mPas.

Powder:

The starting dispersions D1 to D7 were mixed with protective colloids PC1 to PC5, in the ratios by weight stated in Table 1, and also with addition of 0.5% by weight of antifoam, based on the solids content of the film-forming polymer, stirred for 30 min. and filtered off. Coagulate was not formed in any of the combinations shown in Table 1. The mixtures are spray-dried with addition of 12% by weight of antiblocking agent, based on the solids content of the dispersion, to give the powders P1 to P11.

Comparative Example 1 (P12)

Starting dispersion D2 was admixed with 9% by weight of a polyvinyl alcohol whose degree of hydrolysis was 88 mol % and whose Höppler viscosity was 4 mPas. After addition of 0.5% by weight of antifoam, the mixture was stirred for 30 min. and filtered off. The mixture was spray-dried with addition of 12% by weight of antiblocking agent, based on the solids content of the dispersion.

Comparative Example 2 (P13)

The starting dispersion (D8) used comprised a vinyl acetate-ethylene copolymer dispersion whose solids content was 49% by weight and whose Tg was –5° C., prepared with 12% by weight of Catiofast® CS. Attempts to obtain a dispersion with a small proportion of protective colloid <10% by weight failed. The dispersion (D8) was admixed with 6% by weight of a polyvinyl alcohol whose degree of hydrolysis was 88 mol % and whose Höppler viscosity was 4 mPas. After addition of 0.5% by weight of antifoam, the mixture was stirred for 30 min. and filtered off. The mixture was spray-dried with addition of 12% by weight of antiblocking agent, based on the solids content of the dispersion. This did not give a powder resistant to blocking.

Comparative Example 3 (P14)

The starting dispersion used comprised a vinyl acetate-ethylene copolymer dispersion whose solids content was 55% by weight and whose Tg was 10° C. (D9), prepared with 6% by weight of polyvinyl alcohol whose degree of hydrolysis was 88 mol % and whose Höppler viscosity was 4 mPas. This was admixed with 8% by weight of a polyvinyl alcohol whose degree of hydrolysis was 88 mol % and whose Höppler viscosity was 4 mPas. The mixture was stirred for 30 min. and filtered off. The mixture was spray-dried with addition of 12% by weight of antiblocking agent, based on the solids content of the dispersion, to give powder P14.

Testing:

The powder properties of the resultant powders and their workability in a sealing slurry were studied.

Determination of Blocking Resistance (BR):

To determine blocking resistance, the dispersion powder was placed in an iron tube with a screw thread and then subjected to a load from a metal ram. Material was stored at 50° C. for 16 hours in a drying cabinet under load. After cooling to room temperature, the powder was removed from the tube and resistance to blocking was determined qualitatively by crushing the powder. Blocking resistance was classified as follows:

1=very good blocking resistance, no clump formation
2=good blocking resistance

3=satisfactory blocking resistance
4=not resistant to blocking, powder after crushing no longer flowable.

Determination of Sedimentation Behaviour (Tube Sedimentation, TS):

The sedimentation behaviour of the redispersion serves as a measure of the redispersibility of the powder. The redispersions were generated at 50% strength in water via action of strong shear forces.

Sedimentation behaviour was then determined on dilute redispersions (0.5% solids content). 100 ml of this dispersion was charged to a graduated tube and the height of settled solid was measured. The data are stated as mm of sediment after 24 hours. Values greater than 7 show inadequate redispersion of the powder.

Table 1 collates the results of the blocking resistance (BR) test and of the sedimentation behaviour (TS) test on the dispersion powders.

TABLE 1

| Powder No. | Dispersion | Protective colloid | BR | TS |
|---|---|---|---|---|
| P1 | D1 | 5% by wt. of PC 1 | 2 | 2 |
| P2 | D2 | 6% by wt. of PC 1 | 2 | 1.8 |
| P3 | D2 | 6% by wt. of PC 2 | 1-2 | 1.4 |
| P4 | D1 | 3.5% by wt. of PC 4 | 2 | 1.5 |
| P5 | D2 | 3.5% by wt. of PC 4 | 1 | 1.6 |
| P6 | D3 | 2% by wt. of PC 4 | 2 | 3.0 |
| P7 | D4 | 4% by wt. of PC 4 | 2 | 2.5 |
| P8 | D1 | 5% by wt. of PC 5 | 1 | 1.1 |
| P9 | D5 | 5% by wt. of PC 4 | 1 | 1.6 |
| P10 | D6 | 5% by wt. of PC 4 | 1-2 | 1.0 |
| P11 | D7 | 5% by wt. of PC 4 | 1 | 1.4 |
| P12(c. ex.) | D2 | 9% by wt. of PVA | 2 | 0.7 |
| P13(c. ex.) | D8 | 6% by wt. of PVA | 4 | 7 |
| P14(c. ex.) | D9 | 8% by wt. of PVA | 2 | 1.8 |

Comparative Example P13 shows that a procedure in which the cationic protective colloid is used during polymerization gives products which are not redispersible and are not blocking-resistant.

The following mix was utilized to prepare a cementitious sealing slurry:

| | |
|---|---|
| Quartz sand | 665 parts |
| Portland cement | 50 parts |
| Cellulose | 5 parts |
| Dispersion powder | 280 parts |
| Water | 400 parts |

Workability (W) is assessed during mixing of the dry components with water.

The workability of the sealing slurry is a subjective perception of the user. Workability was classified as follows:
1=very good, easy to shape, no trowel adhesion
2=somewhat difficult to work, slight trowel adhesion
3=inadequate workability, highly viscous and tacky The cementitious sealing slurry was drawn to give a film with the aid of a doctor whose gap width was 2 mm and this film was dried for 7 d under standard temperature and humidity conditions (23° C., 50% relative humidity). The films obtained were assessed for flexibility and deformability. They were classified as follows:
1=homogeneous, smooth film, very good deformability
2=smooth film, good deformability
3=smooth film, little deformability
4=brittle film, poor deformability Ultimate tensile strength (UTS in MPas) and tensile strain at break (TSB in %) of the specimens were determined by testing in the DIN 53455 tensile test.

Table 2 gives the results for workability and flexibility, and also ultimate tensile strength and tensile strain at break after 28 d of storage under standard temperature and humidity conditions.

TABLE 2

| Powder No. | W | Flexibility | UTS (MPa) | TSB (%) |
|---|---|---|---|---|
| P4 | 1-2 | 1 | 1.6 | 100 |
| P5 | 1 | 1 | 1.4 | 105 |
| P7 | 1-2 | 2 | 1.5 | 92 |
| P12(c. ex.) | 3 | 3 | 1.6 | 41 |

The following mix was utilized to prepare a cementitious high-flexibility adhesive:

| | |
|---|---|
| Quartz sand | 576 parts |
| Cement (mixture composed of Portland and alumina cement) | 300 parts |
| Cellulose ether | 4 parts |
| Dispersion powder | 120 parts |
| Water | 240 parts |

Workability (W) (scale as described above) is assessed during mixing of the dry components with water and is given in Table 3.

Tensile bond strengths in N/mm$^2$ were determined to EN 12004 (EN 1348 test standard).
Storage A: 28 d, standard temperature and humidity conditions;
Storage B: 7 d, standard temperature and humidity conditions/21 d storage in water;
Storage C: 14 d, standard temperature and humidity conditions/14 d storage in water at 70° C./1 d, standard temperature and humidity conditions;
Storage D: 7 d, standard temperature and humidity conditions/21 d storage in water/5 d, 25 frost/thaw cycles.
Table 3 shows the results.
Deformability in mm was determined to EN 12002. Table 3 shows the results for the various dispersion powders.

TABLE 3

| Powder No. | Workability | Tensile bond strengths (N/mm$^2$) | | | | Deformability (mm) |
|---|---|---|---|---|---|---|
| | | Stor. A | Stor. B | Stor. C | Stor. D | |
| P9 | 1 | 1.84 | 1.01 | 2.36 | 1.00 | 11.0 |
| P10 | 1 | 1.83 | 1.05 | 2.31 | 1.07 | 11.2 |
| P11 | 1 | 2.15 | 1.04 | 2.4 | 1.08 | 11.7 |
| P14 (c. ex.) | 2-3 | 2.12 | 1.11 | 2.76 | 1.04 | 11.6 |

It can be seen from the data that preparation of the inventive products involves no problems related to coagulation during preparation of the mixture of dispersion and cationic protective colloid and of additives. Furthermore, even very small amounts of cationic protective colloid give blocking-resistant powders which have very good redispersing properties. Very good workability properties are achieved moreover, even with high polymer contents, for example in sealing slurry mixes or tile adhesive mixes.

Tables 2 and 3 show that, when comparison is made with conventional powders such as P12 and P14, stabilized exclusively with polyvinyl alcohol, the powders prepared according to the invention exhibit improved elasticity and workability in applications where large amounts of dispersion powder are used.

The invention claimed is:

1. A process for the preparation of cationically stabilized and water-redispersible polymer powder compositions, comprising polymerizing one or more ethylenically unsaturated monomers by free-radical polymerization in an aqueous medium in the presence of a protective colloid and/or emulsifier selected from the group consisting of non-ionic protective colloids, non-ionic emulsifiers, and mixtures thereof, to form an aqueous polymer dispersion, and then drying the aqueous polymer dispersion thereby obtained after addition of a cationic protective colloid selected from the group consisting of homo- or copolymers of one or more cationic monomers from the group consisting of diallyldimethylammonium chloride (DADMAC), diallyldiethylammonium chloride (DADEAC), (3-methacryloxy)propyl-trimethylammonium chloride (MPTAC), (3-methacryloxy)ethyltrimethylammonium chloride (METAC), (3-methacrylamido)propyltrimethylammonium chloride (MAPTAC), 2-dimethylaminoethyl methacrylate (DMAEMA), and 3-dimethylaminopropylmethacrylamide (DMAPMA) as a drying aid, in an amount of from 0.1 to 20% by weight based on the weight of polymeric constituents of the aqueous polymer dispersion.

2. The process of claim 1, wherein the cationic protective colloids comprise polymers which contain monomer units having quaternary ammonium groups.

3. The process of claim 1, wherein the cationic protective colloids have a K value from 10 to 250.

4. The process of claim 1, wherein the cationic protective colloids have a Höppler viscosity of from 1 to 50 mPas.

5. The process of claim 1, wherein the amount of the cationic protective colloid is from 1 to 7% by weight, based on the polymeric constituents of the aqueous polymer dispersion.

6. The process of claim 1, wherein the ethylenically unsaturated monomers comprise one or more monomers selected from the group consisting of vinyl esters of unbranched or branched alkylcarboxylic acids having from 1 to 15 carbon atoms, methacrylates and acrylates of alcohols having from 1 to 15 carbon atoms, vinylaromatics, olefins, dienes and vinyl halides.

7. In a construction-chemistry composition adhesive, render, troweling compound, floor-filling composition, leveling composition, sealing slurry, jointing mortar or paint wherein a polymer powder composition is employed, the improvement comprising including in the construction-chemistry composition a cationically stabilized polymer powder composition prepared by the process of claim 1.

8. The construction-chemistry composition of claim 7 which is an adhesive or coating.

* * * * *